United States Patent [19]

Maylon

[11] Patent Number: 5,761,866
[45] Date of Patent: Jun. 9, 1998

[54] STUCCO REVEAL CONNECTION SYSTEM

[75] Inventor: Gary Joseph Maylon, Trussville, Ala.

[73] Assignee: Alabama Metal Industries Corporation, Birmingham, Ala.

[21] Appl. No.: 724,355

[22] Filed: Oct. 1, 1996

[51] Int. Cl.⁶ ............................................. E04B 1/41
[52] U.S. Cl. .......................... 52/366; 52/255; 52/258; 52/749.13; 403/403; 156/258
[58] Field of Search ........................... 52/309.1, 255, 52/256, 257, 254, 364, 366, 749.13, 657, 656.9; 403/205, 231, 382, 403; 156/258

[56] References Cited

U.S. PATENT DOCUMENTS

| Re. 34,547 | 2/1994 | Weldy | 52/288 |
|---|---|---|---|
| 3,201,908 | 8/1965 | Arnold | 52/255 |
| 5,063,720 | 11/1991 | Bifano et al. | 52/309 |
| 5,086,598 | 2/1992 | Weldy | 52/288 |

Primary Examiner—Carl D. Friedman
Assistant Examiner—Yvonne Horton-Richardson
Attorney, Agent, or Firm—Trexler, Bushnell, Giangiorgi & Blackstone, Ltd.

[57] ABSTRACT

An intersection assembly for use with an architectural stucco reveal system. The stucco reveal system generally includes elongated strips of material which can be attached to an underlying structure. The strips include a base portion and generally two spaced-apart walls extending from a front side of said base portion defining a channel therebetween. Flanges extend away from outside surfaces of the walls and the channel. The intersection assembly includes at least two intersecting portions which have edges which are placed in abutment to define a desired angular configuration of the intersection assembly. A support plate of a generally rigid material compatible for welding to the intersecting portions is welded to a rear side of the intersecting portions. The support plate provides structural support to retain the intersecting portions in the desired angular configuration with the edges thereof in abutment. A small amount of sealant is placed on the rear side of the intersecting portions along a joint defined by the abutting edges of the intersecting portions. Sealant may also be placed along the walls and flanges proximate to the joint and exteriorly of the channel.

15 Claims, 4 Drawing Sheets

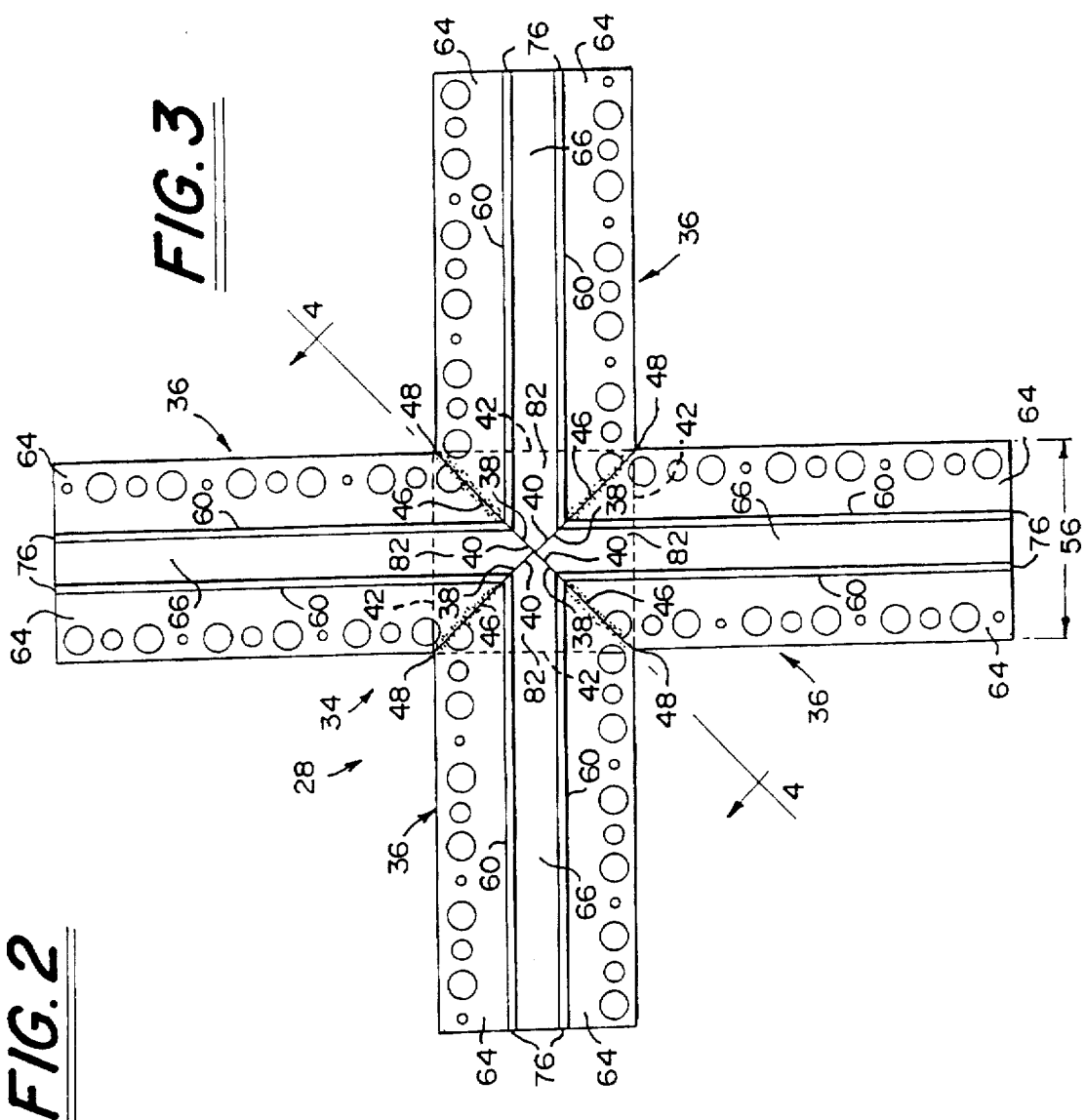
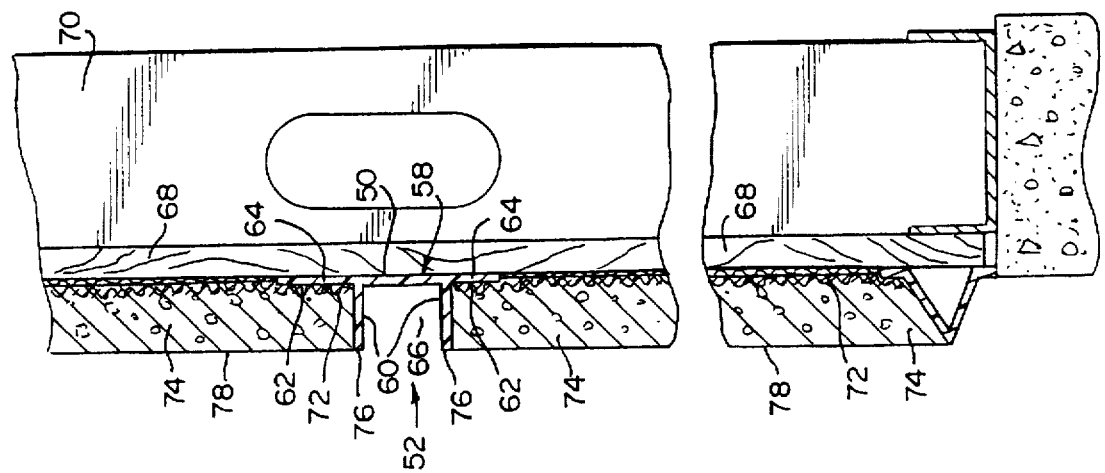

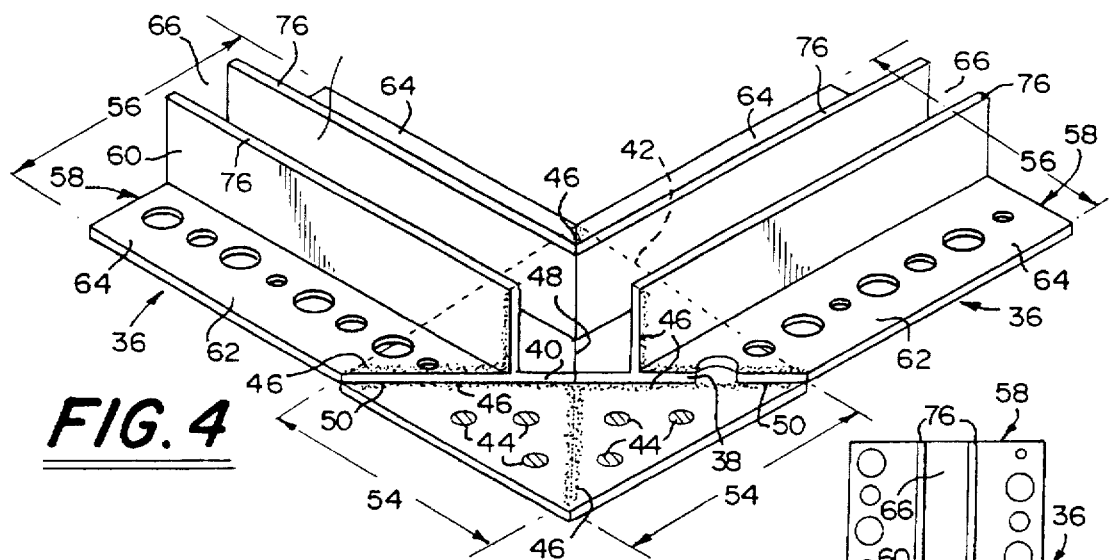
FIG. 4
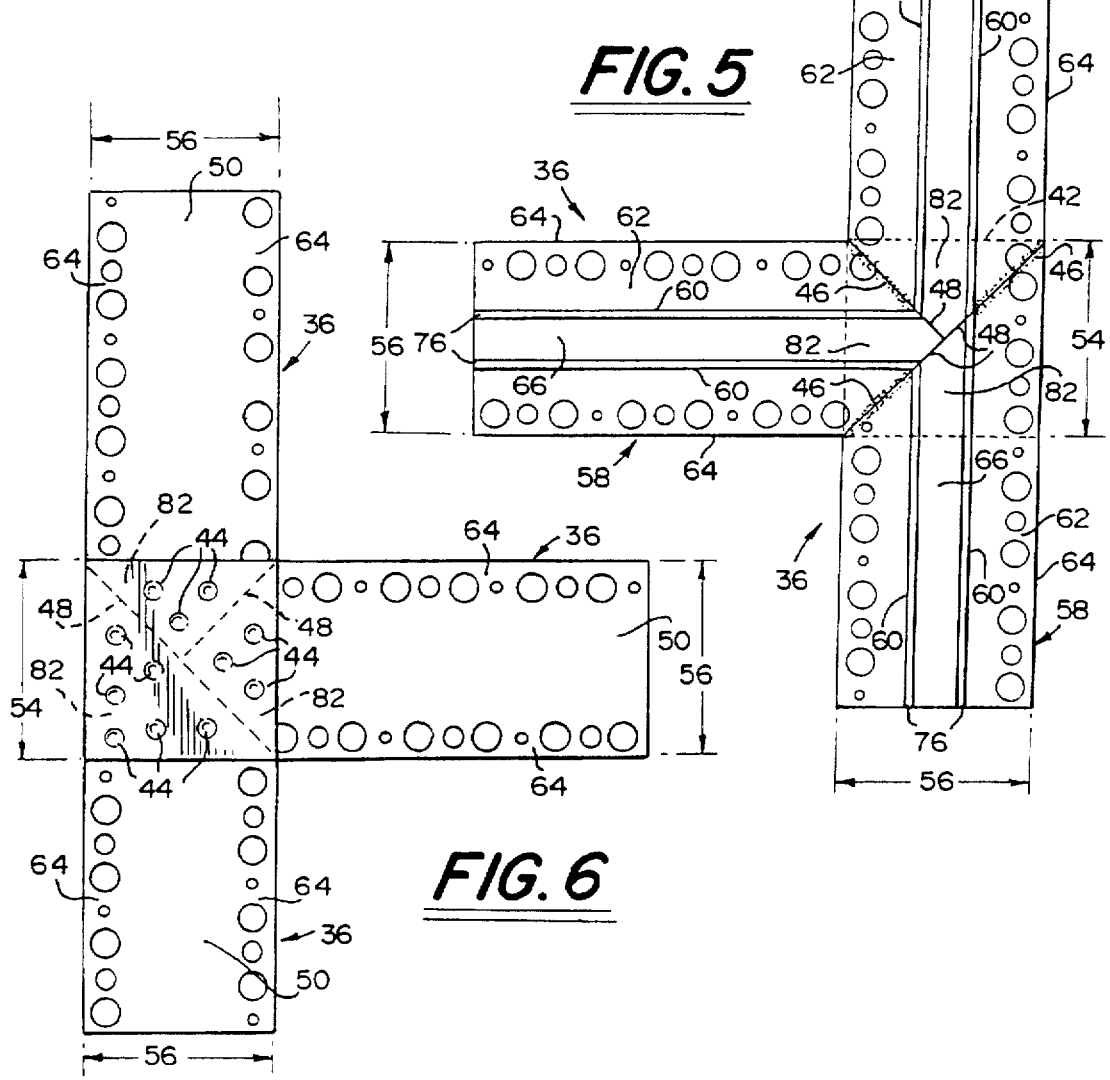
FIG. 5
FIG. 6

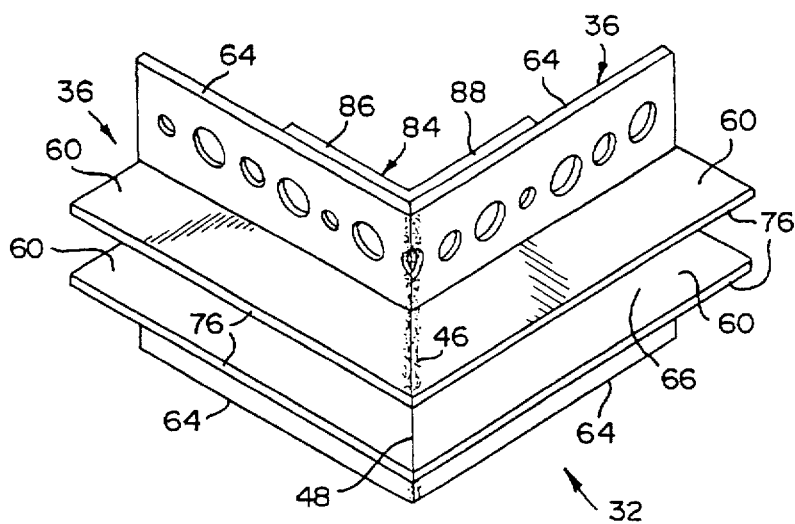
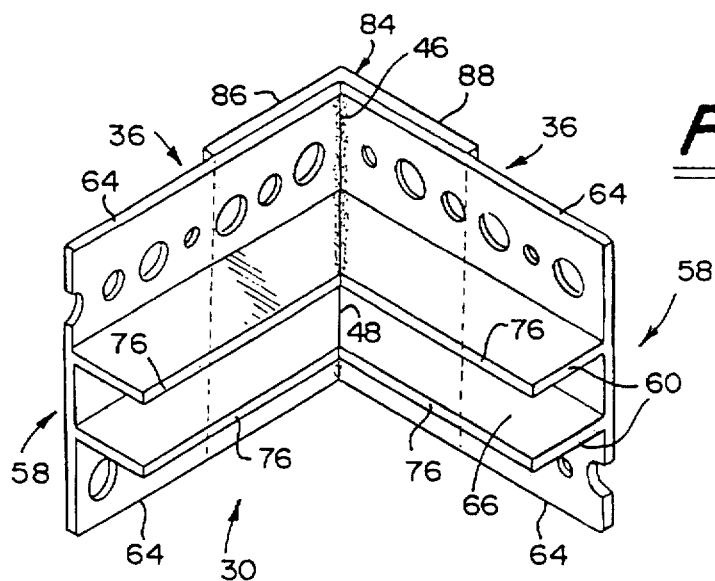
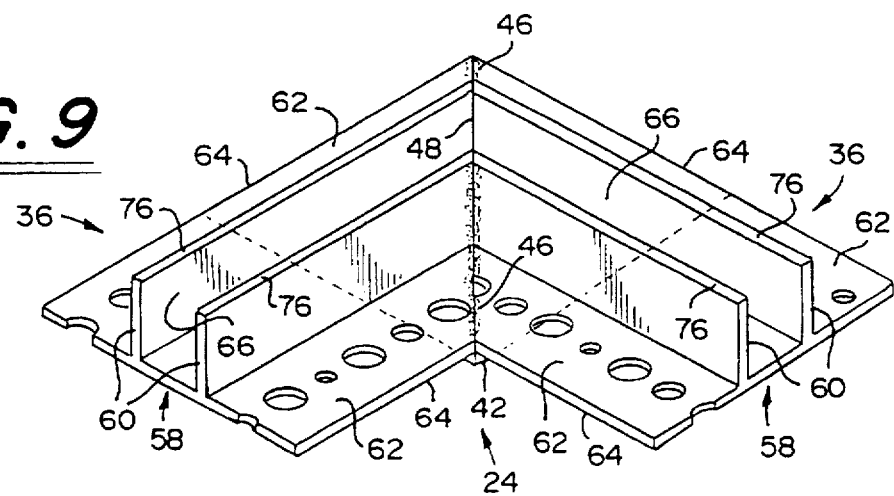

5,761,866

STUCCO REVEAL CONNECTION SYSTEM

BACKGROUND

The present invention relates to a system for providing pre-assembled intersections for use with elongated portions of stucco reveal strips. More specifically the present invention relates to a pre-assembled joint system for use with stucco reveal strips to facilitate ease, reliability, and efficiency in field installation operations of a stucco construction.

Stucco reveal accessories are used on stucco surfaces to provide architectural relief of the surface. For example, on a large open space to be covered with stucco, it may be considered to be architecturally and aesthetically advantageous to divide the surface to enhance the design characteristics. The stucco reveal product is used to divide the large area into small areas, for example, breaking up a large surface into a smaller grid. Two-way, three-way, and four-way joint connections for use on planar surface as well as inside and outside corners are required to connect linear strips in order to form a desired design.

Installation of the linear strip material of the stucco reveal product is generally straightforward requiring a tradesman to nail, screw, or staple the strip to a subsurface material. At the junction of linear strips, however, joints must be mitered and then assembled for connection to the linear strips. One way of preparing such mitered joint connections is to prepare the intersecting portions in the field using portable tools which are available at the job site. As might be expected, such precision work in the field is time-consuming, and perhaps inaccurate thereby increasing costs and the time to complete the job.

It would be preferable to form the intersections in a manufacturing setting to provide increased accuracy and to eliminate this high precision, time-consuming task from the field operations. A pre-manufactured joint connection allows the tradesman to install the stucco reveal product by placing the manufactured joint connections at desired locations and then connecting the intersections with linear strips. This operation will reduce the amount of time and effort involved in the field installations because only a perpendicular end cut is required to fit the linear strip to abut free ends of a manufactured intersection.

One attempt has been made to provide a pre-assembled joint system. This pre-assembled joint system is shown in U.S. Pat. No. 5,036,720 issued Nov. 12, 1991 to Bifano. The pre-assembled joints as shown in Bifano are assembled by providing mitered intersecting sections and then attaching the sections to a backing material. A foil tape is used to attach the sections to the backing. Hot melt glue is used to bond the intersecting portion of the sections. The backing material is indicated as being a foil tape which is used to adhere to the back surface of the mitered sections.

The problem with using foil tape is that it is not rigid and may buckle or allow bending of the intersecting sections relative to one another. Additionally, the foil tape and the hot melt glue may be unsuitable due to material characteristics and as such may fail under a variety of environmental conditions. As might be expected, such stucco constructions may be exposed to extreme thermal effects. The materials used in such constructions should be conducive to expansion and contraction. As a result, the hot melt glue, being a generally rigid substance, may release from the mitered sections if there is a difference in the material expansion and contraction rates. Similarly, the intended water sealing and bonding effect of the adhesive and foil strip may fail as a result of extreme environmental effects.

Additionally, as might be expected, such products need to be very robust in order to withstand shipping, handling, and installation. The intersections may be subjected to being dropped from substantial heights and rough handling during shipping and distribution. The products of the Bifano patent may be subjected to failure as a result of shipping, handling, and installation due to the apparent minor application of hot melt glue to the outside edges of the intersecting portion. As such, it appears that Bifano relies substantially on the foil backing material or a degree of mechanical support. It would appear that foil backing material and an adhesive applied thereto may not be sufficient in order to provide the mechanical characteristics required for surviving detrimental handling conditions.

OBJECT AND SUMMARY

A general object satisfied by the claimed invention is to provide a joint system for use in stucco constructions which is pre-assembled to facilitate butt-end joining of sections thereto in field installations.

Another object satisfied by the claimed invention is to provide a pre-assembled intersection system which includes a plurality of intersecting portions which are welded to a rigid support plate to provide a robust intersection assembly.

A further object satisfied by the claimed invention is to provide an intersection assembly which is generally resistant to water intrusion through mitered joints thereof.

Briefly, and in accordance with the foregoing, the present invention envisions an intersection assembly for use with an architectural stucco reveal system. The stucco reveal system generally includes elongated strips of material which can be attached to an underlying structure. The strips include a base portion and generally two spaced-apart walls extending from a front side of said base portion defining a channel therebetween. Flanges extend away from outside surfaces of the walls and the channel. The intersection assembly include at least two intersecting portions which have edges which are placed in abutment to define a desired angular configuration of the intersection assembly. A support plate of a generally rigid material compatible for welding to the intersecting portions is welded to a rear side of the intersecting portions. The support plate provide structural support to retain the intersecting portions in the desired angular configuration with the edges thereof in abutment. A small amount of sealant is placed on the rear side of the intersecting portions along a joint defined by the abutting edges of the intersecting portions. Sealant may also be placed along the walls and flanges proximate to the joint and exteriorly of the channel.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 2 is a partial fragmentary, cross-sectional, side elevational view taken along line 2—2 in FIG. 1 showing a cross-section of the stucco construction;

FIG. 3 is an enlarged, elevational view of a four-way intersection as shown in FIG. 1;

FIG. 4 is a partial fragmentary, perspective view of a four-way intersection such as is shown in FIG. 3 in which two intersecting portions have been removed to show the construction of the intersection assembly;

FIG. 5 is an enlarged, elevational view of a three-way intersection assembly as shown in FIG. 1 employing the structures and techniques of the present invention;

FIG. 6 is an enlarged, elevational view of the three-way intersection assembly as shown in FIG. 5 illustrating the reversed side or rear side of this intersection assembly;

FIG. 7 is an enlarged, elevational view of a two-way intersection of an outside corner assembly as shown in FIG. 1 employing the structures and techniques of the present invention;

FIG. 8 is an enlarged, elevational view of a two-way intersection of an inside corner assembly as shown in FIG. 1 employing the structures and techniques of the present invention; and FIG. 9 is an elevational view of a two-way intersection assembly as shown in FIG. 1 employing the structures and techniques of the present invention;

DESCRIPTION

Figure 1:
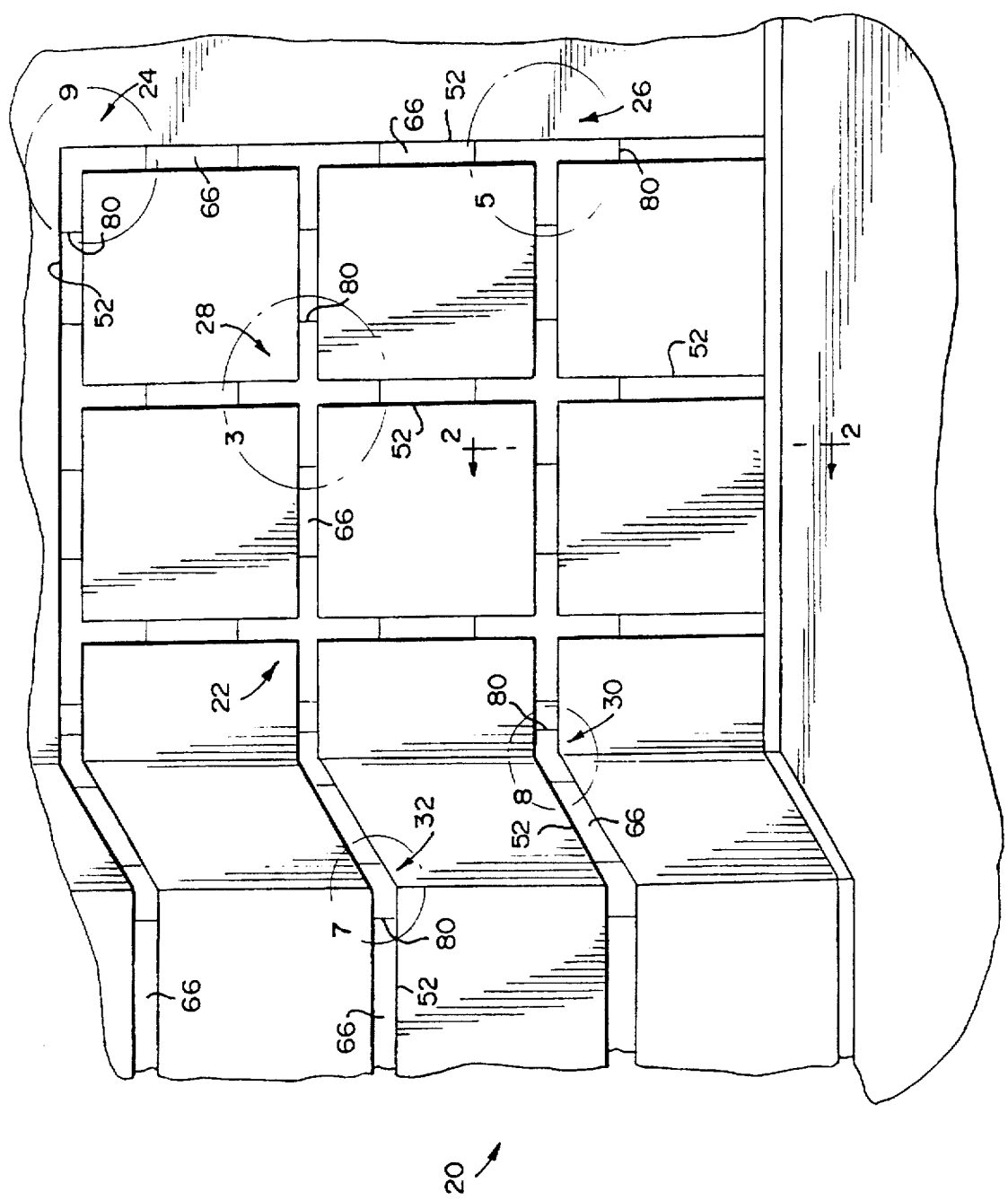
FIG. 1 is a partial fragmentary, perspective view of a representative stucco construction employing a variety of intersection assemblies including a two-way intersection, a three-way intersection, a four-way intersection as well as inside and outside corners used to connect elongated portions forming a desired design on the stucco construction.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIG. 1, a stucco construction 20 is shown in a diagrammatic form to illustrate a variety of intersection configurations. For example, as shown in FIG. 1, there is a two-way generally right angle corner intersection 24, a three-way generally right angle end intersection or T-intersection 26, a four-way intersection 28, a two-way inside corner intersection 30, and a two-way outside corner intersection 32. The intersection configurations as shown as intersection assemblies as described herein in FIGS. 3, 5 and 7-9. In FIGS. 3, 5, and 7-9, the stucco material has been removed in order to show the structure of the corresponding intersection assemblies 34. Reference to an intersection assembly will generally be made by reference numeral 34 with specific configurations of such intersection assemblies as discussed hereinabove being represented by the respective reference numeral.

With further reference to FIGS. 3 and 4, a four-way intersection assembly 28 is shown in FIG. 3 and in which the stucco material has been removed therefrom. The intersection assembly 34 as shown in FIG. 3 includes four intersecting portions 36 which include respective first and second edges 38, 40 with each first edge 38 abutting a corresponding second edge 40 allowing the intersecting portions 36 to be disposed at generally right angles relative to neighboring intersecting portions 36.

With further reference to FIG. 4, two intersecting portions 36 have been removed from the intersection assembly 28 as shown in FIG. 3 to further reveal the construction thereof. The intersecting portions 36 are retained in a desired angular configuration by a support plate 42 which is welded 44 (see FIG. 6) to the intersecting portions 36. The welding of the support plate 42 to the intersecting portions 36 is a common construction technique used in each of the intersecting configurations 24-34 as generally shown in FIG. 1 and more specifically as shown in FIGS. 3, 5 and 7-9.

It is important to note that the material of the intersecting portions 36 and the support plate 42 are compatible for welding. The preferred material as used in the present invention is a plastic material which can be thermally, chemically or ultrasonically welded. Welding results in a direct structural combination of the material of the intersecting portions 36 with the material of the support plate 42. It is a structural interaction which provides the robust structure of the intersecting assembly 34 of the present invention and which overcomes the shortcomings of the prior art.

Another important factor of the present invention is that a sealant 46 is applied sparingly in a small amount to seal a joint 48 defined by neighboring abutting edges 38, 40 between each of the intersecting portions 36. As shown in FIG. 4, the sealant 46 has been applied to a rear side 50 of the intersecting portions 36. The support plate 42 has been placed over the sealant 46 and welded 44 to the intersecting portions 36. The sealant 46 is not used as an adhesive to bond the support plate 42 to the intersecting portions 36 but rather, merely to provide a sealing function to prevent the intrusion of water along the joint 48.

As might be appreciated, it is desirable to prevent changes in the surface of the stucco construction 20. To this end, it is desirable to minimize the rise created by the intersection assembly 34 relative to elongated portions 52 which extend between intersection assemblies 34. As such, the support plate 42 is a generally rigid structure having a minimum size to minimize the variation and height of the intersection assembly 34. Also, the rigid support plate 42 minimizes the material used while maintaining structural integrity of the intersection assembly 34. The rigid support plate 42 as used throughout the generally angular intersections as shown in FIGS. 3, 5 and 7-9 is a generally square structure (see also FIG. 6) having side dimensions 54 which are generally equal to a width dimension 56 of the intersecting portions 36. As such, a minimum amount of material is used in the support plate 42 while still providing a substantial area for welding 44 the intersecting portions 36 in a desired angular configuration.

Having now briefly described the overall invention, we now turn to further description of the drawings for specific examples and illustrations of the structure and function of the present invention as well as the method of constructing the intersection assembly 34 of the present invention. More specifically, the intersecting portions 36 and the corresponding elongated portions 52 are generally formed of an extruded strip material. The strip material, as shown in FIG. 4, includes a base portion 58 with two spaced-apart walls 60 extending from a front side 62 thereof. The base 58 also defines a pair of flanges 64 extending outwardly from the walls 60. The walls 60 define a channel 66 therebetween.

It is the channel 66 which is an important architectural and aesthetic component of the reveal system used in the stucco construction 20.

As mentioned hereinabove in the Background section, it is desirable to break up a continuous stucco construction surface 20 such as a wall or a sealing with a design, shown herein in one form as a grid structure. It is the channels 66 which provide the visual grid structure.

With regard to the cross section as shown in FIG. 2, taken through a horizontally oriented elongated portion 52, the elongated reveal strip 52 is attached to an underlying sheathing material 68. In turn, the sheathing material 68 is attached to a structural support 70 such as a wood or metal beam. Lath material 72 is attached over the sheathing material 68 in accordance with general stucco construction techniques. Plaster or stucco 74 is then applied to the lath in one or more layers. A top edge 76 of the walls 60 provides a screed edge which defines a face surface 78 of the resulting stucco construction. As such, the channel 66 of the elongated portions 52 and the intersection assemblies 34 define the visual break, shown herein as a grid, in the stucco construction 20.

The structure of the intersection assemblies of present invention provide a substantial improvement over the structures and installation techniques currently used in the field. Current field installation techniques require the cutting of the mitered intersecting angles in the field. Needless to say, such field operations may not achieve the desired precision which otherwise might be accomplished in a production or factory setting. A production or factory setting provides greater control of variables such as fixturing and holding of the intersecting portions 36 during cutting operations as well as assembly operations. As such, the intersection assemblies 34 of the present invention provide butt ends 80 which allow the tradesperson at the jobsite to merely make right angle cuts. The present invention eliminates the need to make cuts at angles greater than or less than 90 degrees or multiple angle cuts as might be necessary for three-way or four-way intersection assemblies.

The present invention also eliminates the problems inherent with the known intersection assemblies. The present invention allows the intersection assembly 34 to be produced under a controlled manufacturing setting. The method of producing the intersection assembly 34 includes providing the intersecting portions 36 having edges cut to a desired angular configuration. The intersecting sections are retained in a fixture in an inverted condition so that the rear side 50 is exposed to the assembly person. The intersecting portions 36 are arranged so that the edges 38, 40 are in the desired abutting configuration. The support plate 42 is then positioned over the intersecting portions 36 and welded thereto.

As an intermediate step, sealant 46 may be applied to the joint 48. A sparing amount of sealant 46 is used so as to minimize bleeding through the joint 48 if there are any minor manufacturing tolerance deviations. This is important as it may be desirable to maintain the surfaces within the channel 66 in as clean a condition as possible. Alternatively, sealant 46 may be applied directly to the edges 38, 40, once again in a sparing manner, to provide a sealing affect along the joint 48. It should be noted that the sealant is not used to adhere or bond the structures but merely as a means of preventing water intrusion through the joint. Additionally, sealant may also be applied to the exterior surfaces of the wall 60 and the flanges 64 proximate to the joint 48 to provide additional sealant characteristics. The sealant 46 applied exteriorly of the channel 66 provides a sealing function only and does not provide structural bonding or adhesion of the structures.

Sealant 46 may be omitted from the joints 48 and provided by a tradesman in the field. Many stucco accessory products specify that the tradesman apply a bead of caulk to the joints to seal the joints. As such, a small bead of caulk may be applied to the joint in the field. However, such a bead of caulk would generally be placed within the exposed surfaces of the channel 66 and may be aesthetically less desirable. As such, the present invention facilitates caulking of the joint 48 with a sealant material 46 in a concealed manner. Additionally, the present invention substantially minimizes the amount of sealant 46 which is required further reducing the cost of manufacturing.

A characteristic of the sealant 46, when used in the present invention, is that it is flexible over a broad range of temperatures to accommodate expansion and contraction of the intersecting portions 36 and support plate 42. As might be expected, such stucco reveal systems are often used in exterior settings. Even in indoor settings, such stucco reveal systems will likely endure wide temperature fluctuations. For example, in an exterior setting, a stucco reveal system may need to withstand freezing sub-zero temperatures as well as blistering 100 degree temperatures. In some settings there may be a temperature variation as much as −60 to +100. As such, it is expected that such temperature variations might have detrimental affects on materials which would be used to seal the joints of the intersecting portions 36.

It is believed that this may be a problem with the prior art as shown in U.S. Pat. No. 5,063,720 to Bifano, such that an adhesive foil material and hot melt glue is used to attach the intersecting portions. It is believed that the temperature variation may result in failure of such a system. In contrast, the present invention provides a moisture barrier which can accommodate a broad range of temperature variations. This is because the structural support for the present invention is achieved by welding the support plate 42 to the intersecting portions 36. The welding technique produces an intimate combination of the materials in the intersecting portions 36 and the support plate 42.

It will be appreciated from the foregoing description that the present invention is substantially more efficient, expeditious and likely less expensive to produce than the device as shown in Bifano. In Bifano, a foil material with adhesive thereon must be provided and handled. Foil material is prone to damage as a result of folding or other deformation. The addition of an adhesive material thereon may only exacerbate such a problem. Additionally, a glue material is used to join the intersecting portions in Bifano. The glue must be allowed to set. Even if this is a hot melt glue, there is a dwell time during which the glue must cool in order to dry during the manufacturing process. In contrast, the present invention is substantially improved over the Bifano construction in that the welding almost instantaneously solidifies into a generally continuous portion of material extending generally continuously between the structure of the intersecting portion 36 and the support plate 42. As such, this will improve processing time and expedite the manufacturing process.

As shown in FIGS. 3, 5 and 7-9, a variety of angular intersection configurations may be achieved using the structures and techniques of the present invention as taught herein. It should be noted that other angular configurations may also be achieved using the general teachings provided herein. The right angle angular configurations are shown herein as these are most often employed in grid formation used in many standard stucco constructions.

With regard to the four-way intersection 28, as shown in FIG. 3, four intersecting portions 36 are brought together over a generally square support plate 42 (shown in phantom line) attached to the rear side of the intersecting portions 36. The first and second edges 38, 40 of each intersecting portion 36 are generally cut at a right angle relative to one another. This right angle cut produces an adjoining area 82 which is generally equal on each of the intersecting portions 36. As shown in FIG. 3, a small bead of sealant 46 has been applied exteriorly of the channel 66 along the joint extending between the neighboring flanges 64 and walls 60 of neighboring intersecting portions 36.

In a similar manner, the three-way intersection assembly 26 as shown in FIG. 5 and the two-way intersecting assembly 24 as shown in FIG. 9 employ the structures and techniques of the present invention as described hereinabove. As shown in FIG. 6, the support plate 42 is welded by tack welds or spot welds 44 to the rear side 50 of each of the intersecting portions 36. While the welding is shown with regard to the embodiment as shown in FIGS. 5 and 6, the welding techniques clearly apply to each one of the configurations. It should also be noted that it was mentioned above that various welding techniques may be used to weld the support plate 42 to the intersecting portions 36. Such techniques include thermal welding, ultrasonic welding, as well as chemical welding. The welding process provides an intimate interconnection between the abutting surfaces of the plate 42 and the joining areas 82 of each intersecting portion 36. Alternate patterns of welding may be used such as linear welds or large surface welding techniques may be used instead of the point or tack welding as shown in FIG. 6. The point welds 44 as shown in FIG. 6 are a convenient way of indicating the weld which will achieve the purposes of the present invention. However, continuous lengths of welds may be used to provide added strength and interconnection between the support plate 42 and the intersecting sections 36. Of course, the welding techniques described hereinabove carry over to each of the configurations disclosed herein.

In a similar manner, the inside corner and outside corner intersection assemblies 30, 32 as shown in FIGS. 8 and 7 employ the same general structures and techniques of the present invention. A slight variation occurs with the inside corner and the outside corner 30, 32 in that an angled support plate 84 is employed. The angled support plate includes a first portion 86 and a second portion 88. The first and second portions 86, 88 are disposed at a desired angle corresponding to the desired angle of the inside or outside corner with a right angle shown in the illustrated embodiment. The right angle configuration of the support plate 84 of the intersection assemblies 30, 32 is welded to the intersecting portions 36 to retain the desired angular configuration. Further, whereas the angular cut is made generally along the base portion 58 in the constructions in FIGS. 3, 5 and 9, the angular cut is made through the walls 60 of the constructions as shown in FIGS. 7 and 8. Once again, the techniques of the present invention are employed such that welds 44 are placed along the base 58 to securely attach the support plate 84 to the intersecting portions 36. Sealant may be applied to the joint 48 formed therebetween and in order to prevent intrusion of water along the joint 48. In all of the intersection assembly configurations as shown in the present invention and described herein, the butt joints 80 facilitate easy, expeditious, and reliable connections between the elongated portions 52 and the intersection assemblies 34.

While a preferred embodiment of the present invention is shown and described, it is envisioned that those skilled in the art may devise vario equivalents without departing from the spirit and scope of the invention as defined by the appended claims. The invention is not intended to be limited by the foregoing disclosure.

The invention claimed is:

1. An intersection assembly, comprising:

at least two intersecting portions, each intersecting portion having a front side and a rear side;

each intersecting portion having at least one intersecting edge, said edges of said intersecting portions placed in abutment for defining a joint;

a generally rigid support plate welded to said rear side of each of said intersecting portions with said edges of said intersecting portions in abutment;

a plurality of weld joints connecting said intersecting portions to said generally rigid support plate, said support plate and said intersecting portions being formed of plastic materials which are compatible to facilitate welding thereof to securely attach said generally rigid support plate to each of said intersecting portions and to securely retain said intersecting portions with said edges in abutment; and a flexible, non-structural sealant material positioned on said rear side of said intersecting portions along said joints to generally prevent water intrusion along said joint.

2. An intersection assembly as recited in claim 1, further comprising:

said flexible, non-structural sealant material placed in said joint between said edges with said edges being brought into close abutting position and retained in said close abutting position by said support plate welded to said rear side thereof, said sealant material generally preventing intrusion of water through said joint.

3. An intersection assembly as recited in claim 1, further comprising:

said generally rigid support plate having a generally square shape with dimensions thereof being generally equal to a width dimension of said intersecting portions whereby said generally rigid support plate may be used with an intersection assembly having at least two intersecting portions.

4. An intersection assembly for use with a stucco reveal system, said stucco reveal system employing said intersection assembly attached to a structure with at least one generally continuous, elongated strip section extending from said intersection assembly, said intersection assembly comprising:

at least two intersecting portions, each of said intersecting portions having a front side and a rear side, a base, and at least two spaced-apart walls extending from said base on said front side, said spaced-apart walls defining a channel therebetween, said base including flanges generally extending outwardly away from said walls;

said intersecting portions having edges placed in abutment defining a joint therebetween and forming a generally angular intersection;

a generally rigid support plate welded to said rear side of said intersecting portions;

a plurality of welds joints connecting said intersecting portions to said generally rigid support plate to attach said intersecting portions with said edges in abutment and to provide structural support to retain said intersecting portions in a selected angular configuration; and a flexible, non-structural sealant placed on a portion of said joint defined by abutting edges of said intersecting portions exteriorly of said channel defined between said spaced-apart walls to generally prevent water intrusion alone said portion of said joint.

5. An intersection assembly as recited in claim 4, further comprising:

a flexible, non-structural sealant material placed in said joint between said edges with said edges being brought into close abutting position and retained in said close abutting position by said support plate welded to said rear side thereof, said sealant material generally preventing intrusion of water through said joint.

6. An intersection assembly as recited in claim 4, further comprising:

said support plate having a generally square shape with dimensions thereof being generally equal to a width dimension of said intersecting portions.

7. An intersection assembly as recited in claim 4, wherein said intersection assembly generally defined a right angle intersection having two intersecting portions disposed at a right angle relative to one another, each of said edges of said intersecting portions defining a 45° angle, said support plate being generally square having dimensions generally equal to a width dimension of each of said intersecting portions.

8. An intersection assembly as recited in claim 4, further comprising three intersecting portions one intersecting portion defining an intermediate portion disposed generally at an angle to and extending between the other two of said three intersecting portions, said generally rigid support plate being generally square having dimensions generally equal to a width dimension of said intersecting portions.

9. An intersection assembly as recited in claim 8, wherein said intermediate portion includes a first edge and a second edge disposed generally at a right angle, said first edge and said second edge of said intermediate portion abutting corresponding edges of the other intersecting portions.

10. An intersecting assembly as recited in claim 4, further comprising:

four intersecting portions being disposed generally at right angles to neighboring intersecting portions defining a four-way intersection assembly, each of said intersecting portions having a first edge and a second edge with each of said first and second edges disposed at generally right angles.

11. An intersection assembly as recited in claim 4, further comprising:

two intersecting portions intersecting generally at a desired angle defining an outside corner intersection assembly, said support plate having a first portion and a second portion disposed at said desired angles relative to each other, said first and second portions being attached to the rear side of each of said intersecting portions to retain said intersecting portions in an outside corner configuration.

12. An intersection assembly as recited in claim 4, further comprising:

two intersecting portions intersecting generally at a desired angle defining an inside corner intersection assembly, said support plate having a first portion and a second portion disposed at said desired angle relative to each other, said first and second portions being attached to the rear side of each of said intersecting portions to retain said intersecting portions in an inside corner configuration.

13. A method of constructing an intersection assembly for use with a reveal system, said method including providing at least two intersecting portions, each of said portions having intersecting edges which form a joint when assembled, said intersecting portions having a front side and a rear side, and providing a generally rigid support plate for welding to said rear sides of said intersecting portions to attach said intersecting portions in a selected angular configuration, said method comprising the steps of:

placing said intersecting edges of said intersecting portions in abutment;

placing said support plate over said rear sides of said intersecting portions overlying said abutting edges; and welding said support plate to said rear side of said intersecting portions with said edges in abutment to securely retain said edges in abutment.

14. A method of forming an intersection assembly as recited in claim 13, further comprising the step of:

placing a sealing material on said rear side of said abutting portions over said joint defined by said abutting edges of said intersecting portions for generally preventing water intrusion through said joint.

15. A method of constructing an intersection assembly as recited in claim 13, said intersecting portions including a base with at least two spaced-apart walls extending from said front side of said base defining a channel therebetween and flanges of said base extending away from said channel defined by said walls, said method further including the step of: placing a flexible, non-structural sealant material on said joint along said flanges exteriorly of said channel to generally prevent water intrusion through said joint.

* * * * *

UNITED STATES PATENT AND TRADEMARK OFFICE
CERTIFICATE OF CORRECTION

PATENT NO. : 5,761,866
DATED : June 9, 1998
INVENTOR(S) : Maylon

It is certified that error appears in the above-identified patent and that said Letters Patent is hereby corrected as shown below:

Column 8, line 54, "alone" should be --along--.

Signed and Sealed this

Sixth Day of October, 1998

Attest:

BRUCE LEHMAN

*Attesting Officer*  *Commissioner of Patents and Trademarks*